United States Patent [19]

Griffith

[11] Patent Number: 4,524,657
[45] Date of Patent: Jun. 25, 1985

[54] AUTOMATIC WIRE CUTTING MACHINE

[75] Inventor: Louis E. Griffith, Hampstead, N.H.

[73] Assignee: Power Access Corporation, Manchester, N.H.

[21] Appl. No.: 502,944

[22] Filed: Jun. 10, 1983

[51] Int. Cl.³ .............................................. B26D 5/24
[52] U.S. Cl. ......................................... 83/69; 83/208;
83/241; 83/522; 83/575; 83/DIG. 1
[58] Field of Search .................. 83/69, 208, 241, 369, 83/522, 575–577, DIG. 1

[56] References Cited

U.S. PATENT DOCUMENTS

| | | | |
|---|---|---|---|
| 805,724 | 11/1905 | Harter | 83/577 X |
| 3,175,430 | 3/1965 | Smith et al. | 83/924 X |
| 3,251,253 | 5/1966 | Eubanks | 83/208 |
| 3,251,255 | 5/1966 | Bauman | 83/295 |
| 3,439,849 | 4/1969 | Matsuzaki | 83/369 X |
| 3,481,520 | 12/1969 | Pickering | 225/4 |
| 3,513,741 | 5/1970 | Shallenberg | 83/278 |
| 3,523,392 | 8/1970 | Carl | 51/99 |
| 3,670,614 | 6/1972 | Streckert | 83/208 |
| 3,732,761 | 5/1973 | Sanders | 83/369 X |
| 3,743,413 | 7/1973 | Sharp et al. | 83/208 X |
| 3,760,669 | 9/1973 | Rosenthal | 83/241 X |
| 3,872,751 | 3/1975 | Schmidt | 83/69 |
| 4,106,685 | 8/1978 | Strunc | 83/241 X |
| 4,192,207 | 3/1980 | Bickford et al. | 83/241 X |
| 4,331,050 | 5/1982 | Gergek | 83/522 X |

FOREIGN PATENT DOCUMENTS 2330221 1/1975 Fed. Rep. of Germany .
2372277 6/1978 France .

Primary Examiner—James M. Meister
Attorney, Agent, or Firm—Hamilton, Brook, Smith & Reynolds

[57] ABSTRACT

In an automatic wire cutting machine a stepper motor driven knurled roller is positioned between two wire guide channels to drive a wire toward a cutting station. The length of wire to be cut is set in a length counter. Drive cycles, during which the wire is driven a predetermined distance, are counted in the length counter. Then, the stepping motor is disabled and cutting blade is energized. This system prevents operation of the cutting blade solenoid at less than an acceptable duty cycle with short lengths of wire. Due to the particular displacement of the wire with each step of the stepping motor, the system is readily converted from English to metric units.

11 Claims, 6 Drawing Figures

SHEET 2

AUTOMATIC WIRE CUTTING MACHINE

DESCRIPTION

1. Field of the Invention

This invention relates to machines for automatically cutting a number of lengths of cable and in particular for cutting lengths of wire used in circuit fabrication.

2. Background

Typically, in the fabrication of circuitry, the fabricator requires a number of equal lengths of cable such as wire or ribbon cables. In the case of wire, once the lengths of wire are cut the insulation must be removed from each end. Ribbon cables have the advantage of being well suited to connectors which pierce the insulator so that there is no need to remove insulation from the ends of the cable.

In the past, machines for automatically cutting lengths of wire and stripping the insulation from the ends thereof have been very expensive. Many fabrication shops cannot justify the high expense of conventional cutter/strippers. Even where the expense of one unit is justified, the cutter/strippers cannot be widely distributed throughout a shop because of the expense.

An object of this invention is to provide a relatively inexpensive cable cutting machine, and the cost of a machine embodying this invention can be an order of magnitude less than that of conventional cutter/strippers. The machine disclosed does not include a stripper, but inexpensive stripping machines are available for use in conjunction with this automatic wire cutter.

DISCLOSURE OF THE INVENTION

In a machine for cutting lengths of cable, a desired length of cable can be set in a length decimal electronic counter and the number of lengths of cable which are to be cut to that length is set in a number decimal electronic counter. Drive cycles are counted in the length counter as a stepping motor is driven. During each drive cycle in which the length counter is clocked, the stepping motor drives a cable a length about equal to the length indicated by the least significant digit set in the length counter. Once the set length has been counted, the number counter is clocked, the stepping motor is disabled and a cutting blade is driven to cut the cable. Unless the number counter indicates that the number of wire lengths has been cut, the length counter is then reset, and it again counts drive cycles as the stepping motor is driven.

In order that the machine can be readily adapted for measuring lengths of cable in either the English units or metric units, the stepping motor drives the cable a length of about 0.020 inch (0.50 millimeters) with each step. That step length is derived from the least common denominator of one-tenth inch and one millimeter lengths. Five steps of the motor provides one-tenth of an inch drive of the cable during a drive cycle or two steps of the motor provides a one millimeter drive of cable during a drive cycle.

If lengths of wire remain to be cut, as indicated by the number counter, the stepping motor is not being driven, and the cutting sequence is not taking place, resetting of the length counter and initiation of a new counting and stepping motor drive sequence takes place. With long lengths of wire, the cutter drive can be activated as soon as the length of cable has been measured out by the machine and the stepping motor is stopped. However, short lengths of cable resulting in rapid successive cuts might exceed the permissible duty cycle of the solenoid driving the cutting blade. Thus, even once a length of wire has been measured out, the cutting blade may be delayed such that it is not driven less than a predetermined time after the previous cut.

A knurled drive roller presses the cable against a spring biased pressure roller in order to provide precise drive of the cable without the need for expensive feedback circuitry.

BRIEF DESCRIPTION OF THE DRAWINGS

The foregoing and other objects, features and advantages of the invention will be apparent from the following more particular description of a preferred embodiment of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

Figure 1:
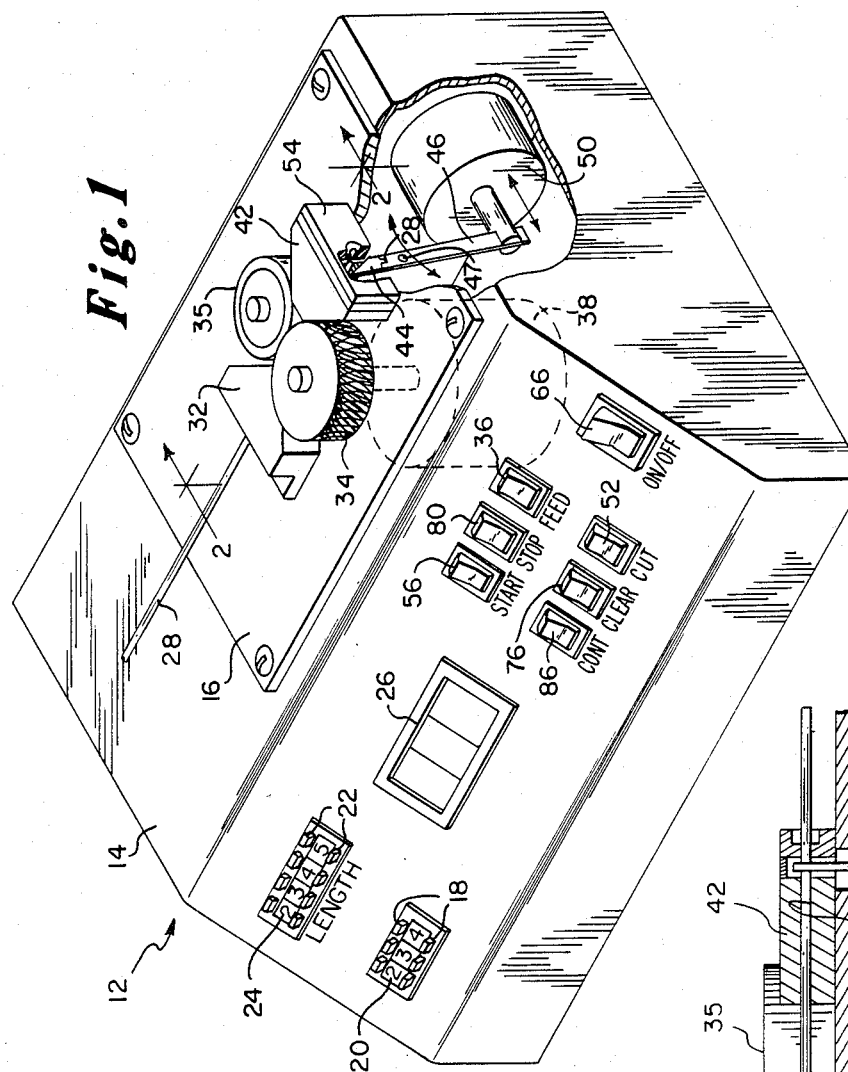
FIG. 1 is a perspective view, partly broken away, of a wire cutting machine embodying this invention.

An automatic wire cutting machine 12 includes a housing 14 which is about 12 inches long, 10 inches deep and 5 inches tall. Control switches and displays are provided on the front face of the housing 14. All of the wire drive and cutting mechanisms are mounted to a plate 16 which can be pulled from the housing for ease of assembly and repair.

The number of wires to be cut to a particular length are set by two sets of buttons 18 which control the respective up and down sequencing of the digits displayed on display 20. The display of 234 indicates that the machine has been set to cut 234 lengths of wire.

The length of each of the wires to be cut is set by two sets of buttons 22 which control the display 24. The display indicates that each of the 234 wires to be cut is to be cut to a length of 234.5 inches. As will be discussed below, the system can be readily modified to control the length in millimeters.

A light emitting diode display 26 indicates the number of the 234 lengths of wire which must still be cut. A number of switches are provided on the front face and their functions will be discussed in detail below.

Figure 2:
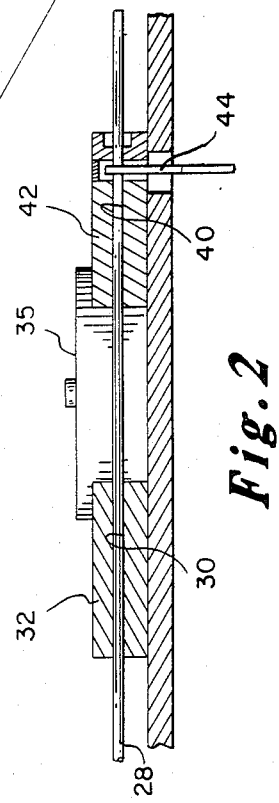
FIG. 2 is a cross sectional view of the guide channels in the wire cutting machine of FIG. 1.

Wire 28 is fed from a reel (not shown) from the left of the machine and passed through the channel 30 in the block 32 (FIG. 2). Wire is further fed between a knurled drive roller 34 and a pressure roller 35. The pressure roller is spring biased toward the knurled roller so that the wire is firmly gripped by the rollers and can be driven with negligible slip. The knurled roller provides for negligible slip for precision drive of the wire yet also has low wear characteristics. By pressing the feed switch 36, a stepping motor 38 is energized to drive the knurled roller 34 and to thus drive the wire into a right hand guide channel 40 in a block 42. The wire is fed past a cutting blade 44.

The cutting blade 44 is mounted at the end of an arm 46 which is pivoted on a pin 48. The arm 46 is driven by a solenoid actuator 50. When the cut switch 52 is pressed, the solenoid 50 is energized and the blade 44 is driven toward the rear of the machine to cut the wire. The system is then ready for automatic feed and cutting of lengths of wire.

The blade 44 can be readily replaced by first removing an end plate 54. The blade is fixed to a shaft 28 of square cross section which is set into a yoke at the end of the arm 46. To replace the blade, the blade is simply withdrawn axially and a new blade is moved into the yoke axially. No special connecting element is required because the forces in the cutting blade during the cutting operation are transverse to the axis of the arm 46.

Once the number of wire lengths to be cut is set in display 20 and the length of those wires is set in display 24, the start button 56 can be pressed to start automatic operation of the machine. By means of the circuitry to be discussed below, the stepping motor 38 and knurled roller 34 drive the wire the length set on the display 24. The stepping motor is then stopped and the solenoid 50 is energized. If additional segments remain to be cut, as indicated on display 26, the stepping motor 38 is then again energized to feed another length of wire past the blade and the blade is again energized.

Figure 3:
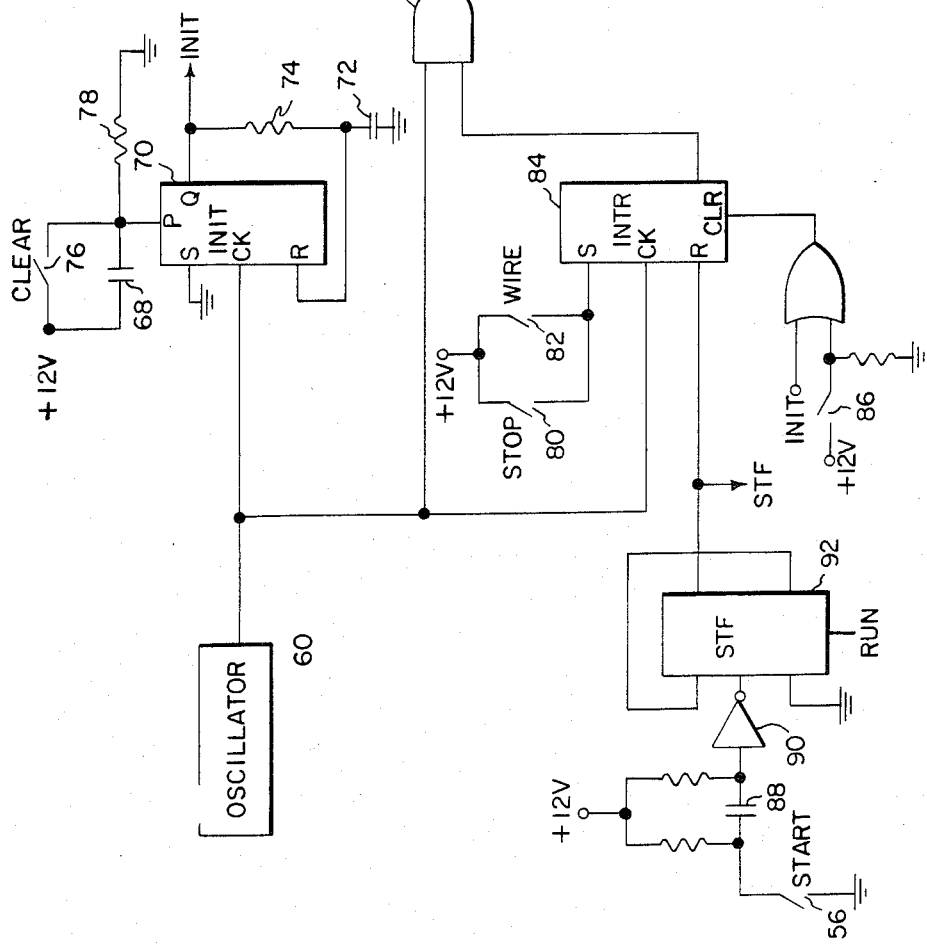
FIG. 3 is an electrical schematic diagram of the clock and timer circuitry for the machine of FIG. 1.
Figure 4:
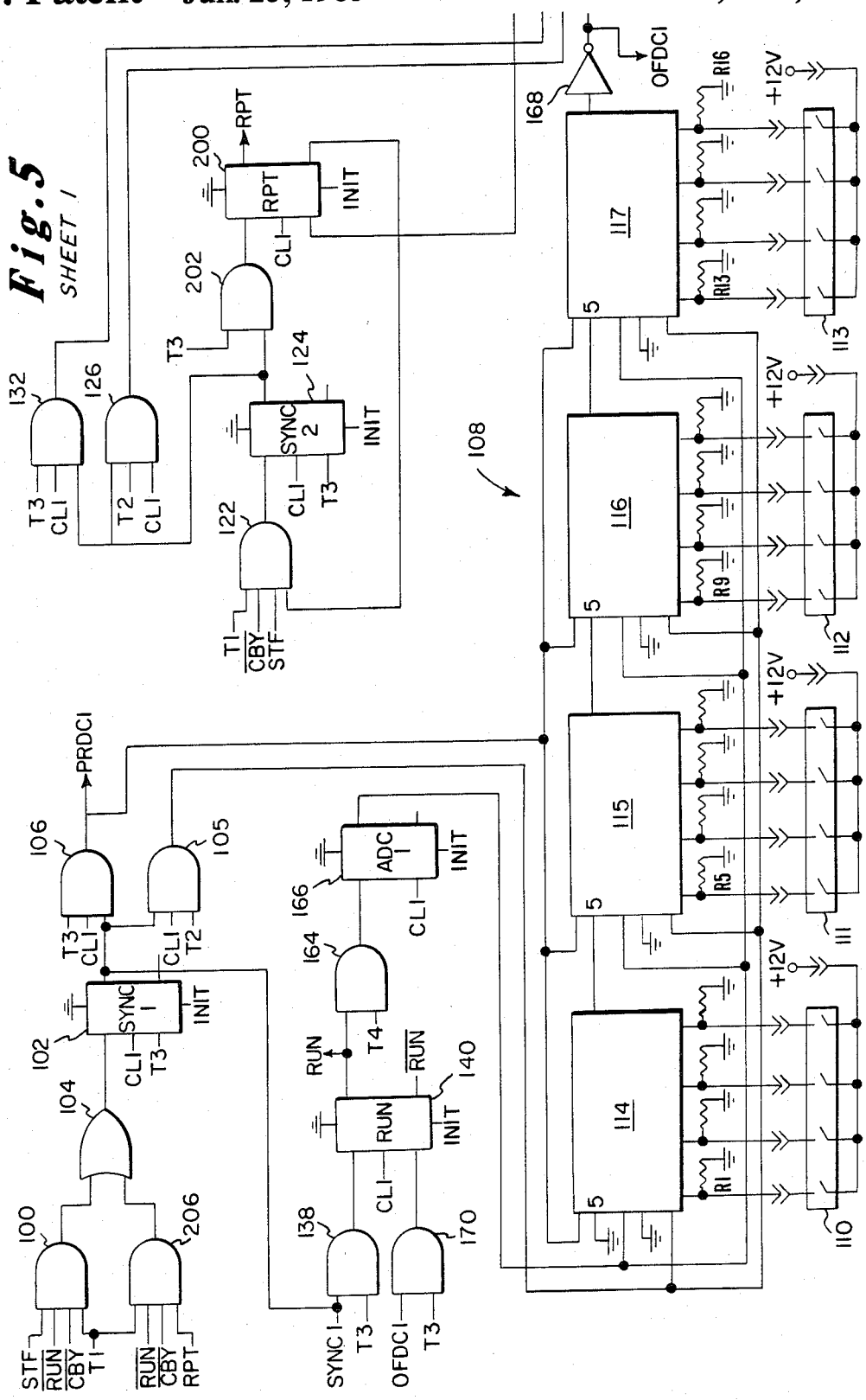
FIG. 4 is a timing diagram of the clock signal CL1 and timing signals T1 through T5 generated by the circuit of FIG. 3.
Figure 5:
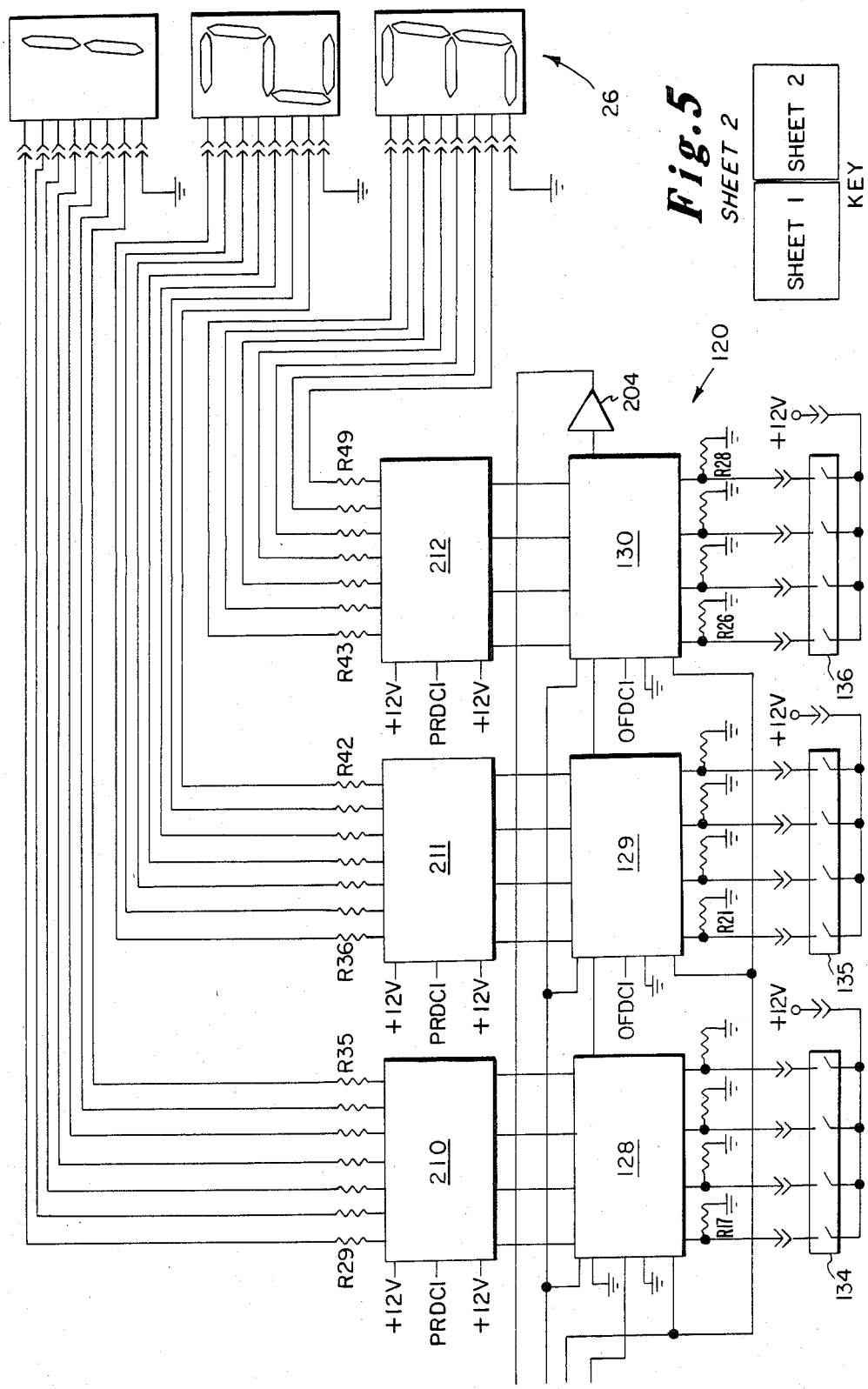
FIG. 5 is an electrical schematic diagram of the counter and display circuit of the machine in FIG. 1.
Figure 6:
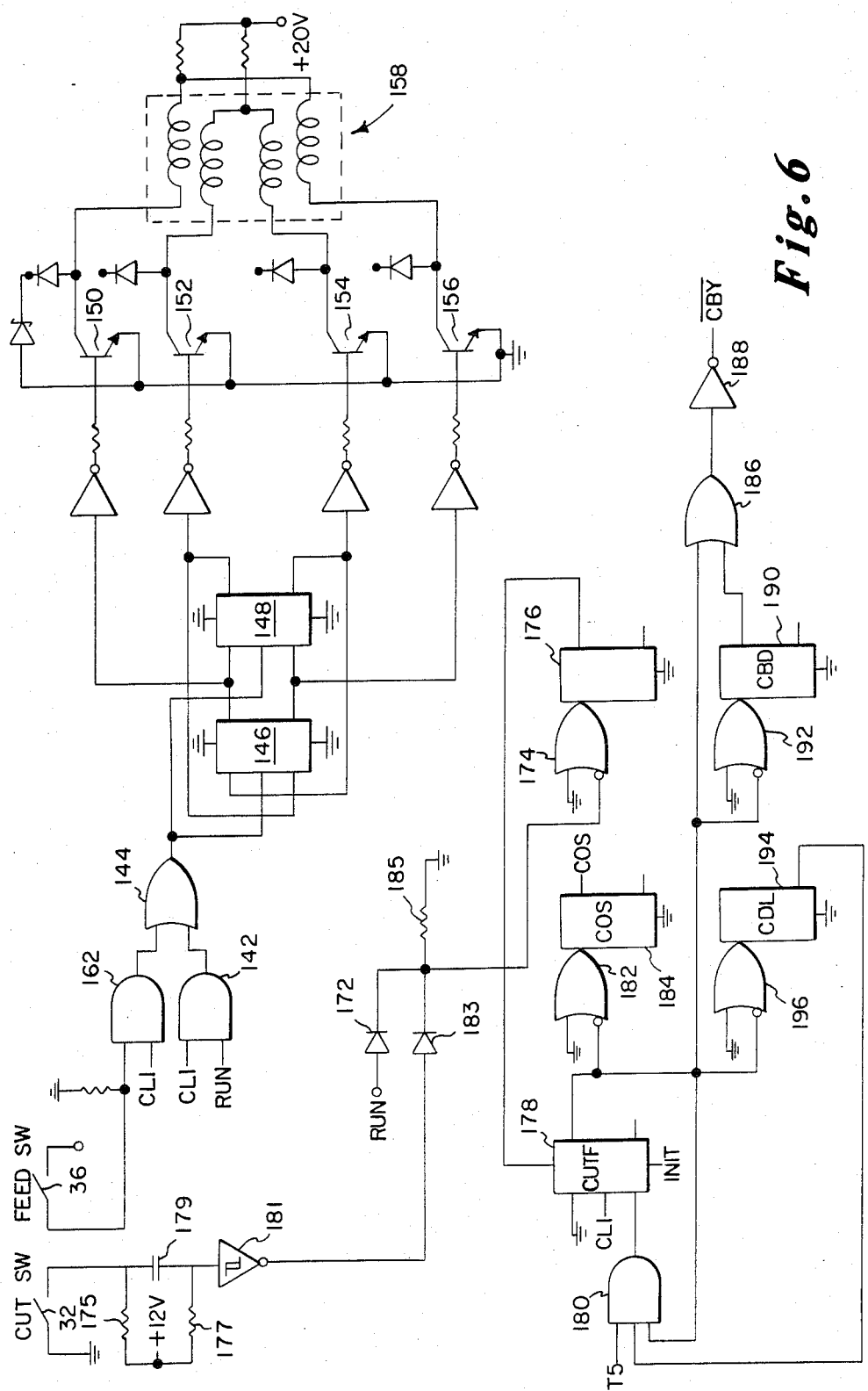
FIG. 6 is an electrical schematic diagram of the cutter and motor drive circuitry in the machine of FIG. 1.

The control circuitry for the machine is shown in FIGS. 3, 5 and 6. As shown in FIG. 3, timing for the system is obtained from an oscillator 60 which provides a signal at its output of about 500 hertz. Unless that oscillator output is interrupted by an AND gate 62, it passes to the CL1 output of the timing circuit. The CL1 signal is the basic clock for the system. The CL1 signal is applied to a timer circuit 64 which includes a modulo 5 counter and logic circuitry to provide the signals T1 through T5. Those signals are shown relative to the clock CL1 in FIG. 4.

When the system is first turned on by the switch 66 on the housing, the rising signal at the 12 volt supply is differentiated by a capacitor 68 to provide a positive pulse to the preset input of an initiate flip flop 70. This provides a high Q output which is the INIT signal. The INIT signal is used to reset a number of flip flops in the circuit when power is first turned on. The INIT signal charges a capacitor 72 through the resistor 74 to reset the flip flop 70. Thus, the flip flop is connected as a one shot multivibrator.

The INIT signal can also be provided by pressing a clear switch 76 which provides a high signal across resistor 78.

Oscillator pulses can be interrupted by the AND gate 62 when the stop switch 80 is pressed or when an indication is provided from the wire supply reel that the reel is empty, thereby closing switch 82. Closing either switch sets the interrupt flip flop 84 such that the Q-output of the flip flop prevents the oscillator signal from passing through the AND gate 62. Either the INIT signal or pressing of the continue switch 86 will clear the flip flop to provide a high input to the AND gate and allow for clocking of the system.

To initiate automatic feeding and cutting of the wire, the start button 56 is pressed. The low signal is differentiated by capacitor 68 to provide a high output from inverter 90. The start flip flop 92 is normally cleared so that the clock signal applied to that flip flop will set the flip flop and provide a high STF signal. The STF signal also resets the interrupt flip flop 84 so that clock signals can pass through the AND gate 62.

The STF signal is applied to an AND gate 100 in the counter and display circuit of FIG. 5. Because the stepping motor would not at that time be running the RUN-signal would be high and because the cutting blade would not be cutting the CBY- signal would be high. Thus, on the T1 timing signal a synchronizing flip flop 102 would be set through an OR gate 104. The high Q output from the flip flop 102 would then be applied at time T2 through an AND gate 104 to clear the length counter 108. Then, at time T3 the signal would be applied through the AND gate 106 to load the counter 108. At that time, the binary coded decimal inputs from the switches 110, 111, 112 and 113 would be loaded into the counter stages 114, 115, 116 and 117. The binary coded decimal input to the counter stages would be the complements of the number set by the length display 24. With the complements thus loaded, the counter 108 thereafter counts up to an overflow condition which indicates the full count displayed on display 24.

The number counter 120 is similarly cleared and loaded at this time. Specifically, the STF signal is applied at time T1 through the AND gate 122 to set the synchronizing flip flop 124. The high output is applied at time T2 through an AND gate 126 to the clear inputs of the counter stages 128, 129 and 130 of the number counter. Then at time T3 the signal is passed through AND gate 132 to load the counter stages 128, 129 and 130 with the binary coded decimal values indicated by switches 134, 135 and 136. These values are the complements of the numbers set in the display 20.

At time T3, the SYNC1 signal from flip flop 102 is applied through an AND gate 138 to set a RUN flip flop 140. The RUN signal is applied to an AND gate 142 in FIG. 6. With the high RUN signal, each clock of signal CL1 is passed through the AND gate 142 and an OR gate 144 and is applied to gray code stepper motor drive registers 146 and 148. So long as the run signal is high, successive ones of the transistors 150, 152, 154 and 156 are turned on with each CL1 pulse to draw current through the stepper motor coils 158.

Clock signal CL1 can also be applied through the OR gate 144 by closing the feed switch 36 at the input of AND gate 162. The high RUN signal is also applied, at time T4, through an AND gate 164 in FIG. 5. This sets the ADC1 flip flop 166 to apply a clock pulse to the length counter stages 114–117. With the low input to pin 5 of the stage 114, that stage counts up by one. The ADC1 flip flop is then reset by the T5 signal.

It can be seen that, for each pulse applied to the length counter 108 at time T4 in the drive cycle while RUN is high, five pulses CL1 are applied to the stepper motor drive circuit. The angular displacement of the stepper motor and the radius of the knurled roller 34 are selected such that the circumferential displacement of the knurled roller 34 and thus the displacement of the wire is 0.020 inch. Thus, the five steps of the stepper motor in each drive cycle provide a 0.1 inch displacement of the wire for each count in the length counter 108.

When the first stage 114 overflows, it applies a low pulse to the next more significant stage 115, so that stage is also clocked to count up by one. The stage 115 will not again count up until the stage 114 has counted through ten drive cycles. The more significant stages 116 and 117 are similarly enabled only when the preceding stage has counted through ten drive cycles.

Once the length counter 108 has counted the length set in display 24 and is thus in an overflow condition, a low signal is applied to an inverter 168 to provide a high overflow signal OFDC1. The signal OFDC1 is applied to the three stages of the number counter 120, so that counter counts up by one. The OFDC1 signal is also used to stop the drive to the stepping motor. At time T3 it is applied through AND gate 170 to reset the RUN flip flop 140. The RUN signal then goes low so that the stepping motor is no longer driven.

The RUN signal is applied through a diode 172 in the cut drive circuit of FIG. 6. Through the inverting input of an OR gate 174 the falling edge of the RUN signal triggers a one shot multivibrator 176. That one shot sets a cut flip flop 178. Ordinarily the center input to AND gate 180 is high so that at time T5 the high Q signal from the cut flip flop 178 is applied through AND gate 180 to the reset input of the flip flop. The resultant falling edge of the Q output is applied through the inverting input of an OR gate 182 to a one shot multivibrator 184. The output COS from the one shot is applied directly to the drive circuit of solenoid 50 to drive the cutting blade. The length of the cutter drive signal is determined by the one shot 184.

When the Q output of the cut flip flop 178 is first set, that signal is applied through an OR gate 186 and an inverter 188 to provide a low CBY- signal. That low signal indicates that the cutter drive circuit has been set and subsequent automatic feed of the wire is inhibited. When the one shot 184 is triggered by the falling edge of the Q output of flip flop 178 the one shot 190 is also triggered through an OR gate 192. This one shot assures that the signal CBY- remains low for a predetermined time after the Q signal has gone low in order to allow for cutting of the wire and retraction of the blade before continued feed of the wire is permitted.

If very short lengths of wire are to be cut, the duty cycle of the cuts might be shorter than that which the solenoid 50 can safely handle. Therefore, even once a length of wire has been fed past the cutting blade and the cutter flip flop 178 has been set, the one shot 184 may not be triggered for a time to allow for a safe duty cycle of the solenoid. To that end, the falling edge of the Q output of flip flop 178 triggers a one shot 194 through an OR gate 196. This sends the Q- output of the one shot low for the time set by the one shot, and the flip flop 178 cannot be reset through the AND gate 180. After the time determined by the one shot 194, flip flop 178 would be reset at the next time T5.

The cutting cycle can alternatively be initiated by closing the cut switch 52. A high signal is generally applied through resistors 175 and 177 to the capacitor 179. When the switch 52 is closed, the input to an inverter 181 is pulled low through the capacitor 179 and then returned high through resistor 177. The falling edge of the resultant pulse through diode 183 triggers the one shot 176 through the inverting input of OR gate 174.

When the number counter 120 is loaded at the start of machine operation, a repeat flip flop 200 is set through an AND gate 202. The RPT output of that flip flop remains high so long as the counter 128 has not reached the overflow condition. When the counter 120 overflows, indicating that the full number of wire lengths have been cut, a signal is applied through inverter 204 to reset the RPT flip flop 200.

So long as the number counter has not reached the overflow condition the signal from the Q-output of the flip flop 200 remains low and the start signal cannot be passed through AND gate 122. This prevents accidental clearing of the counter 120 if the start switch is pressed.

When the RPT signal indicates that additional lengths of wire must be cut, the RUN- signal indicates that the stepping motor is not being driven and the CBY- signal does not indicate a cutting sequence (from setting of the flip flop 178 to the falling edge of the one shot 190) the system drives the next length of wire and repeats the counting and cutting sequences. Under those conditions, AND gate 206 passes a signal through the OR gate 104 to the SYNC1 flop flip 102. The length counter is again cleared and is loaded with the length indicated by the display 24, and the RUN flip flop 140 is set to drive the stepping motor. The sequence of loading the length counter, driving the stepping motor while counting drive cycles and driving the cutting blade continues until the number counter 120 overflows and the RPT signal goes low.

The count of the number counter is displayed on the digital display 26 through decoder and display driver circuits 210, 211 and 212.

The 0.020 inch drive of the wire with each step of the stepping motor was selected in order that the system can be readily converted to metric lengths without requiring changes to the mechanical hardware. One millimeter is approximately equal to 0.04 inch. The least common denominator of 0.04 inch (2/50 inch) and 0.1 inch (5/50 inch) is 50. Thus, five steps of the 1/50 inch displacement (0.02 inch) results in a total displacement of 0.1 inch. Similarly, two steps of the 0.02 inch displacement results in a total of 0.04 inch displacement or approximately one millimeter. Any common denominator of 0.1 inch and 0.04 inch could be used to set the wire displacement per step but the least common denominator of 50 provides the least number of steps for both 0.1 inch and one millimeter.

To account for the slight inaccuracy of the relationship 0.04 inch approximating one millimeter, the roller 34 could be replaced with a roller having a slightly different diameter. However, a small change in diameter would not require shifting of the blocks 32 and 42 or of the cutter mechanism. Also the roller 36 is spring baised so that it would still press snugly against the knurled roller 34.

As an alternative, a microprocessor could be used to provide the electronic control. In that case, the microprocessor could make occasional adjustments to account for the inaccuracy of the metric drive over long lengths of wire. Also, a microprocessor could most readily allow for either English or metric measurements in a single machine by controlling the number of steps per length count. The microprocessor could also be programmed to accelerate and decelerate the stepping motor to overcome the inertia of the reel of wire, thus maximizing the wire cutting speed.

While the invention has been particularly shown and described with reference to a preferred embodiment thereof, it will be understood by those skilled in the art that various changes in form and details may be made therein without departing from the spirit and scope of the invention as defined by the appended claims. For example, by providing a different cable drive mechanism and a different cutting blade, such as a guillotine blade, the same electronic control could be used in an automatic cutting machine for cutting ribbon cable.

I claim:

1. A machine for cutting lengths of cable comprising:
a drive roller for engaging the cable and driving it with no more than negligible slip;
a stepping motor for driving the drive roller;
means for setting a desired length of cable;
means for setting a number of lengths of cable which are to be cut to the set length;
means for counting drive cycles until the number of cycles corresponding to the set length have been counted;
means for driving the stepping motor, the stepping motor and roller driving a cable a length about equal to the length indicated by the least significant digit of the set length during each counted drive cycle;
cutter control means for disabling the stepping motor and for driving a cutting blade once the drive cycles corresponding to the set length have been counted, the cutter control means defining a delay from each drive of the cutting blade during each subsequent drive of the stepping motor such that the cutting blade is driven not less than a predetermined time after any previous cut;
means for counting the number of lengths of cable which have been cut; and
means for repeating the count of drive cycles, while driving the stepping motor, and the cutting of cable until the set number of lengths have been counted.

2. A machine as claimed in claim 1 wherein the distance that the cable is driven with each step of the stepping motor is 1/CD where CD is an approximate common denominator of lengths indicated by the least significant digit of the set length in English or metric units.

3. A machine as claimed in claim 2 wherein the least significant digit is 0.1 inch in English units and 1 millimeter in metric units and 1/CD is about 0.020 inch (0.50 millimeter).

4. A machine as claimed in claim 1 wherein the drive roller is a knurled roller and a spring biased pressure roller presses the cable against the knurled roller.

5. A machine for cutting lengths of cable comprising:
a length digital electronic counter;
a number digital electronic counter in series with the length counter;
means for setting the length counter to a desired length of cable;
means for setting the number counter to a number of lengths of cable which are to be cut to the length set in the length counter;
a timer for providing a drive cycle time;
means for intiating counting of drive cycles by the length counter;
means for driving a stepping motor, the stepping motor driving a cable a length about equal to the length indicated by the least significant digit set in the length counter during each drive cycle in which the length counter is clocked;
means for clocking the number counter, disabling the stepping motor drive, and
actuating a solenoid which drives a cutting blade once the length which is set in the length counter has been counted the cutting blade being driven not less than a predetermined time after any previous cut; and
repeat means for resetting the length counter and for again initiating counting of the length counter and drive of the stepping motor after drive of the cutting blade whenever the number counter indicates cable remains to be cut, the cutter drive circuit has not been set for cutting, it is not within a predetermined time after a cutting operation is initiated, and the stepping motor is not being driven.

6. A machine as claimed in claim 5 wherein the distance that the cable is driven with each step of the stepping motor is 1/CD where CD is an approximate common denominator of lengths indicated by the least significant digit of the set length in English or metric units.

7. A machine as claimed in claim 5 wherein the least significant digit is 0.1 inch in English units and 1 millimeter in metric units and 1/CD is about 0.020 inch (0.50 millimeter).

8. A machine as claimed in claim 5 wherein the drive roller is a knurled roller and a spring biased pressure roller presses the cable against the knurled roller.

9. A machine as claimed in claim 8 further comprising a cable guide channel ahead of the knurled drive roller and a second cable guide channel between the knurled drive roller and the cutting blade.

10. A machine for cutting lengths of cable comprising:
a cable blade;
a length digital electronic counter;
a number digital electronic counter in series with the length counter;
means for setting the length counter to a desired length of cable;
means for setting the number of lengths of cable which are to be cut to the length set in the length counter;
a timer for providing a drive cycle time;
means for initiating counting of drive cycles by the length counter;
means including a knurled drive roller and a spring biased pressure roller for driving a stepping motor, the stepping motor driving a cable a length of about 0.020 inch (0.50 mm) with each step and a length about equal to the length indicated by the least significant digit set in the length counter during each drive cycle in which the length counter is closed;
a cable guide channel ahead of the knurled drive roller and a second cable guide channel between the knurled roller and the cutting blade;
means for clocking the number counter, disabling the stepping motor drive, and setting a cable cutter drive circuit once the length which is set in the length counter has been counted;
means for driving the cutting blade, after setting of the cutter drive circuit, not less than a predetermined time after any previous cut; and
repeat means for resetting the length counter and for again initiating counting of the length counter and drive of the stepping motor a predetermined time after the start of cutter blade drive unless the number counter has counted the number of lengths set therein.

11. A machine as claimed in claim 10 wherein the repeat means resets the length counter and initiates a new counting sequence in the length counter and a new stepping motor drive sequence whenever the number counter indicates cable remains to be cut, the cutter drive circuit has not been set for cutting, it is not within a predetermined time after a cutting operation is initiated, and the stepping motor is not being driven.

* * * * *